US009442293B2

(12) United States Patent
Alton et al.

(10) Patent No.: US 9,442,293 B2
(45) Date of Patent: Sep. 13, 2016

(54) COMPOSITE VARIABLE LIGHT ATTENUATOR

(71) Applicant: MICROSOFT TECHNOLOGY LICENSING, LLC, Redmond, WA (US)

(72) Inventors: Daniel J. Alton, Bellevue, WA (US); Nathan Ackerman, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 145 days.

(21) Appl. No.: 14/271,139

(22) Filed: May 6, 2014

(65) Prior Publication Data

US 2015/0323795 A1 Nov. 12, 2015

(51) Int. Cl.
*G02F 1/133* (2006.01)
*G02B 27/01* (2006.01)
*G01J 1/42* (2006.01)
*G02C 7/10* (2006.01)
*G02C 11/00* (2006.01)
*G02F 1/01* (2006.01)
*G02B 1/00* (2006.01)

(52) U.S. Cl.
CPC ......... *G02B 27/0172* (2013.01); *G01J 1/4204* (2013.01); *G02B 1/005* (2013.01); *G02B 27/0101* (2013.01); *G02B 27/017* (2013.01); *G02C 7/101* (2013.01); *G02C 7/104* (2013.01); *G02C 11/10* (2013.01); *G02F 1/0121* (2013.01); *G02F 1/13306* (2013.01); *G02B 2027/0118* (2013.01); *G02B 2027/0178* (2013.01)

(58) Field of Classification Search
CPC . G01J 1/4204; G02B 27/0172; G02B 1/005; G02B 27/017; G02B 27/0101; G02F 1/13306; G02F 1/0121; G02C 7/101; G02C 7/104; G02C 11/10
See application file for complete search history.

(56) References Cited

U.S. PATENT DOCUMENTS 4,249,244 A 2/1981 Shofner et al.
6,453,081 B1 9/2002 Trezza et al.
7,246,949 B2 7/2007 Thiele et al.
(Continued)

FOREIGN PATENT DOCUMENTS

EP 2562588 A1 2/2013
EP 2653907 A1 10/2013
WO 2009060166 A1 5/2009
WO 2013155403 A1 10/2013

OTHER PUBLICATIONS

Cohen, Stephen, "New breakthrough design for VOAs based on electro-optic materials", In Lightwave, Jan. 2000, 3 pages.
(Continued)

*Primary Examiner* — James Dudek
(74) *Attorney, Agent, or Firm* — Micah Goldsmith; Judy Yee; Micky Minhas

(57) ABSTRACT

An optical stack includes a first variable element and a second variable element. The first variable element is configured to vary light transmission through the first variable element as a function of a first control signal. The second variable element is in series with the first variable element and is configured to vary light transmission through the second variable element as a function of a second control signal. A controller dynamically supplies the first control signal to the first variable element and supplies the second control signal to the second variable element.

17 Claims, 5 Drawing Sheets

(56) References Cited

U.S. PATENT DOCUMENTS

| | | | |
|---|---|---|---|
| 2002/0131745 | A1 | 9/2002 | Azarbar |
| 2007/0127864 | A1 | 6/2007 | Welch et al. |
| 2011/0221981 | A1* | 9/2011 | Tanaka ................ G02F 1/13471 349/13 |
| 2012/0068913 | A1 | 3/2012 | Bar-Zeev et al. |
| 2012/0235756 | A1 | 9/2012 | Nishida |
| 2015/0049283 | A1* | 2/2015 | Hwang ............. G02F 1/133536 349/96 |
| 2015/0309312 | A1* | 10/2015 | Alton ................ G02B 27/0172 345/592 |

OTHER PUBLICATIONS

"High-speed optical devices & components", Retrieved on: Dec. 6, 2013, Available at: http://www.trimatiz.com/en/Products_En_VOA.htm#VOA_Order, 2 pages.

ISA European Patent Office, International Search Report and Written Opinion Issued in Application No. PCT/US2015/028677, Jul. 31, 2015, WIPO, 11 pages.

PEA European Patent Office, Second Written issued in PCT Application No. PCT/US2015/028677, May 6, 2016, WIPO, 6 pages.

* cited by examiner

COMPOSITE VARIABLE LIGHT ATTENUATOR

BACKGROUND

See-through displays allow people to simultaneously view real objects and displayed images. For example, a see-through display with an eyeglass form factor may be worn by the user, and light from the real world may travel through the glasses to the user's eyes. At the same time, the glasses may visually present virtual images to the user using near-eye display technology.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an embodiment of this disclosure an optical stack includes a first variable element and a second variable element. The first variable element is configured to vary light transmission through the first variable element as a function of a first control signal. The second variable element is in series with the first variable element and is configured to vary light transmission through the second variable element as a function of a second control signal. A controller dynamically supplies the first control signal to the first variable element and supplies the second control signal to the second variable element.

DETAILED DESCRIPTION

The present disclosure is directed to the control of light transmission through an optical stack utilizing two or more variable optical elements. For example, the optical stack may selectively increase or decrease the amount of ambient light that is transmitted through the optical stack. This type of variable light transmission may be based on a relative amount of ambient light, such that light transmission is increased for low ambient light and decreased for high ambient light. While described below in the context of a head-mounted display system, it is to be understood that altering light transmission based on input light, as described herein, may be used in numerous different applications.

Head-mounted display systems allow a user to view real world objects and virtual objects in an integrated fashion. However, a user wearing the head-mounted display system may be exposed to numerous environments with constantly changing amounts of ambient light. This may change the perceived brightness of virtual objects, making the user's experience less immersive. Further, power constraints may limit the brightness of virtual objects appearing on the head-mounted display system.

In order to consistently control the brightness of the real world and virtual objects appearing on the head-mounted display system, transmission of ambient light through the head-mounted display system can be attenuated, such that an increase in ambient light does not result in an increase in ambient light perceived by the user. The system disclosed herein provides rapid, continuous control of light transmission over the wide range of ambient light conditions a user may encounter.

In one example, an optical stack may include two or more variable elements in series and under synchronous control. A first variable element may have a wide range of light transmission with discrete light transmission intervals. A second variable element may have a narrower range of light transmission, but may support a continuous light transmission gradient. By synchronously altering the light transmission levels of the first and second variable elements, the optical stack can rapidly switch between light transmission levels over a wide, continuous light transmission range.

Figure 1:
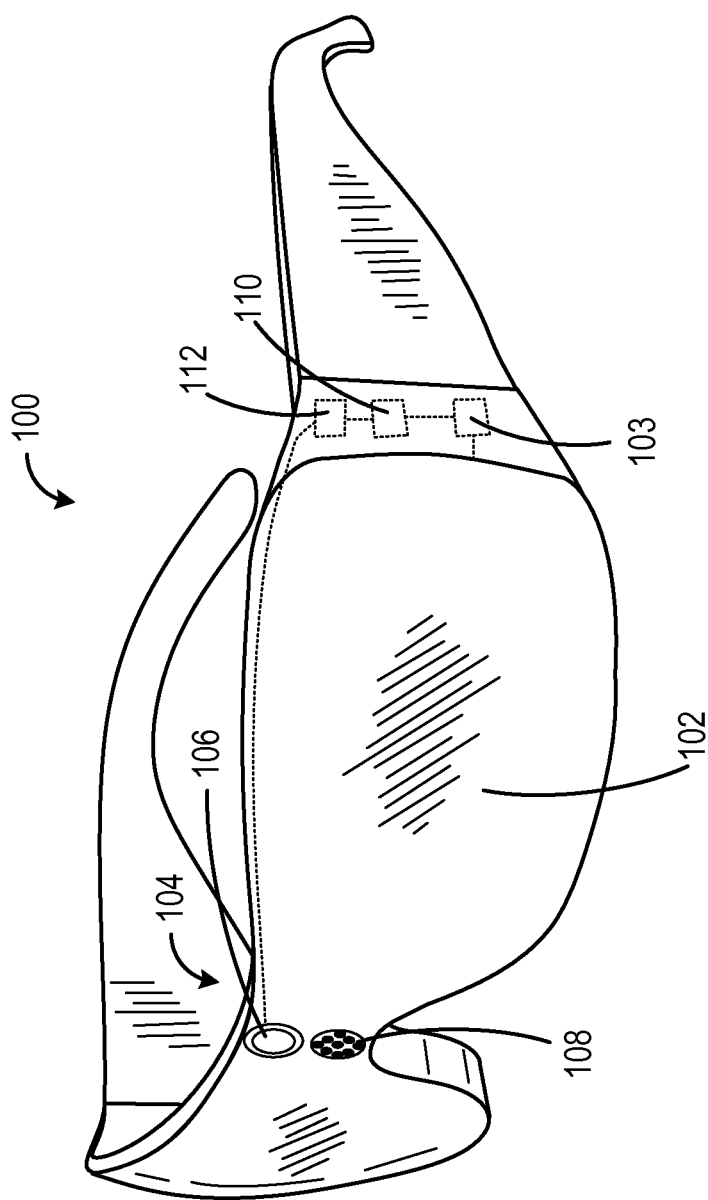
FIG. 1 shows an example head-mounted display system.

FIG. 1 depicts an example head-mounted display system 100. The head-mounted display system 100 takes the form of a pair of wearable glasses or goggles. The head-mounted display system 100 includes a see-through display 102 that may be configured to visually augment an appearance of a physical environment to a user viewing the physical environment through the see-through display. Head-mounted display system 100 may be configured to augment the reality of a real-world environment having various ambient lighting conditions.

For example, the appearance of the real-world background may be augmented by graphical content that may be presented with the see-through display 102 such that the graphical content may appear to be in front of the real-world background. In particular, an image production system 103 may be configured to display an image of a virtual object with the see-through display 102.

In some configurations, the head mounted display system may be an additive display system in which holographic light may be displayed on the see-through display. For example, one or more partially transparent pixels can emit light to a user's eye. The user can view real-world objects through and/or around the pixel, but the emitted light can seemingly illuminate the background objects viewed through and/or around the pixel.

The head-mounted display system 100 includes an optical sensor system 104 that may include one or more optical sensors. In one example, the optical sensor system 104 includes an inward facing optical sensor 106 and an outward facing optical sensor 108. The inward facing optical sensor may be configured to perform gaze detection or other analysis on the user's eyes. The outward facing optical sensor may be configured to detect the real-world background from a similar vantage point (e.g., line of sight) as observed by the user through see-through display 102. In some configurations, the sensor subsystem may include two or more different inward and/or outward facing optical sensors (e.g., outward facing color camera and outward facing depth camera).

The head-mounted display system 100 may further include a position sensor system 110 that may include one or more position sensors (e.g., accelerometer(s), gyroscope(s), magnetometer(s), global positioning system(s), multilateration tracker(s), etc.) that output position sensor information useable to assess a position, orientation, and/or movement of the relevant sensor.

Optical sensor information received from the optical sensor system 104 and/or position sensor information received from position sensor system 110 may be used to assess a position and orientation of the vantage point of the see-through display relative to other environmental objects. In some configurations, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 112) and/or an off-board computing system.

Furthermore, the optical sensor information and the position sensor information may be used by a computing system to perform analysis of the real-world background, such as depth analysis, surface reconstruction, environmental color and lighting analysis, or other suitable operations. In particular, optical sensor 104 may be further configured to detect and quantify an amount of ambient light via one or more ambient light sensors, and/or via outward facing optical sensor 108. The optical and positional sensor information may be used to create a virtual model of the real-world background. In some configurations, the position and orientation of the vantage point may be characterized relative to this virtual space. Moreover, the virtual model may be used to determine positions of virtual objects in the virtual space.

As described above, the head-mounted display system may comprise a see-through display configured to display an image of a virtual object while transmitting ambient light from a surrounding environment. However, the mobile nature of the head-mounted display system may be such that ambient conditions may produce more light than can be produced by the see-through display. For example, if a user desires to operate the head-mounted display system in direct sunlight, the ambient light of the sun may overwhelm or at least partially wash out the images produced by the see-through display. It may therefore be advantageous to attenuate the amount of ambient light that passes through the see-through display to the pupils of the user, in order that the user may view a proper mix of real-world objects and virtual objects.

Figure 2:
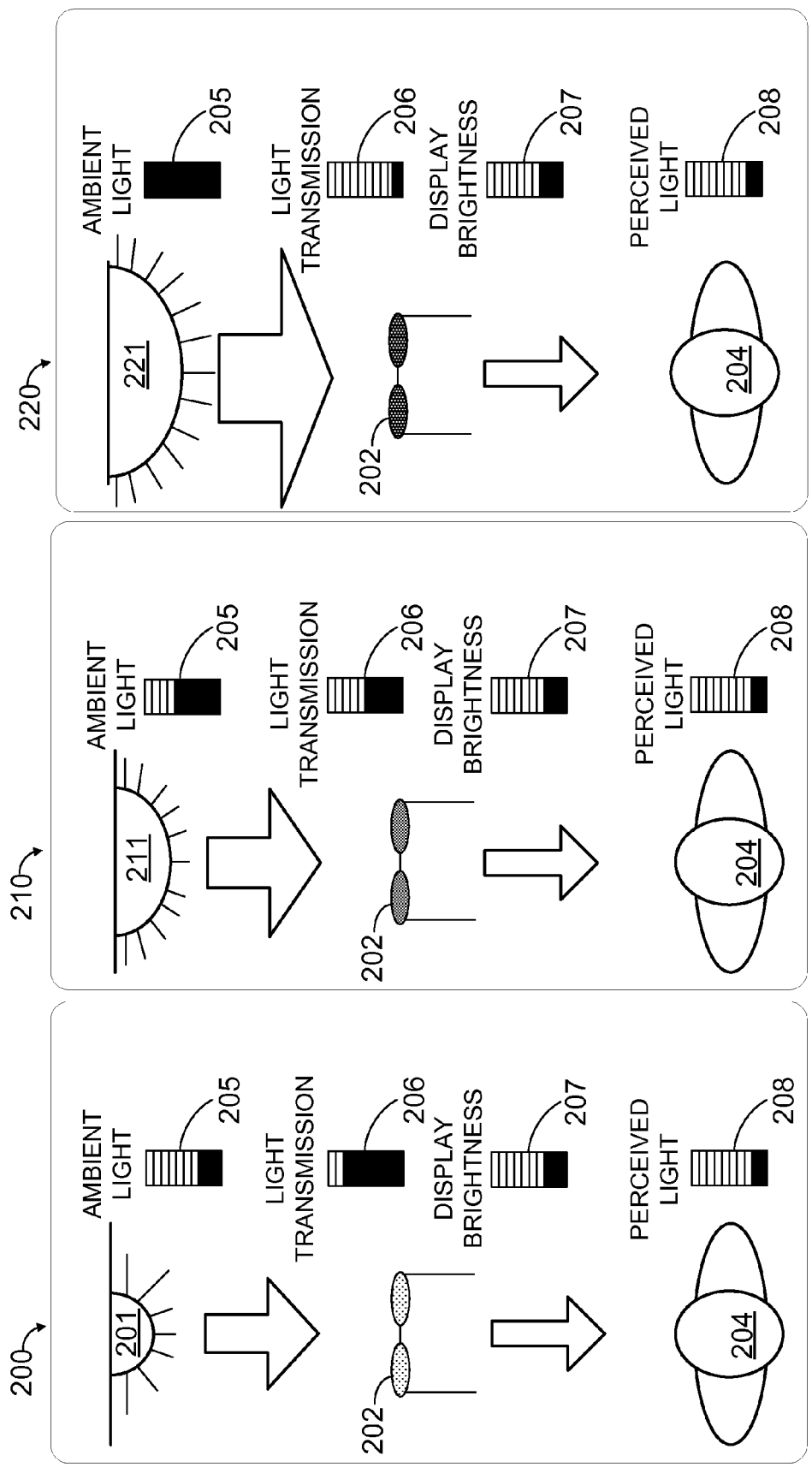
FIG. 2 somewhat schematically shows altering light transmission through a head-mounted display system based on ambient light conditions.

FIG. 2 depicts examples of how ambient light may be attenuated. In a first example, environment 200 depicts a relatively low amount of ambient light 201 that may be transmitted through a see-through display of head-mounted display system 202 to the pupils of user 204. Meter 205 indicates the relative amount of ambient light. Throughout this figure, meter 205 indicates a greater amount of ambient light with an increased amount of black bars (e.g. more black corresponds to more ambient light, and less black corresponds to less ambient light). Meter 206 indicates a relative amount of light transmission allowed by the see-through display of head-mounted display system 202. Throughout this figure, meter 206 indicates a greater amount of light transmission with an increased amount of black bars (e.g. more black corresponds to more light transmission, and less black corresponds to less light transmission). Meter 207 indicates a relative display brightness for the see-through display of head mounted display system 202. Throughout this figure, meter 207 indicates a greater amount of display brightness with an increased amount of black bars (e.g. more black corresponds to more display brightness, less black corresponds to less display brightness). Meter 208 indicates a relative amount of perceived light reaching the pupils of user 204. Throughout this figure, meter 208 indicates a greater amount of perceived light with an increased amount of black bars (e.g. more black corresponds to more light reaching the pupils of user 204, less black corresponds to less light reaching the pupils of user 204).

For environment 200, the ambient light 201 is at a relatively low level as indicated by meter 205. For example, environment 200 may be a modestly-lit indoor room. As such, the amount of brightness produced by the head-mounted display system 202 may be only slightly less than the amount of ambient light 201, as indicated by meter 207. Accordingly, the amount of light transmission allowed by the see-through display of head-mounted display system 202 is relatively high, as indicated by meter 206. In other words, the see-through display provides a low level of light attenuation. Thus, the amount of ambient light reaching the pupils of user 204 is relatively low, as indicated by meter 209.

For environment 210, ambient light 211 is at a relatively moderate level, as indicated by meter 205. For example, environment 210 may be a well-lit indoor room, or an outdoor area with indirect sunlight. As such, the amount of light produced by the head-mounted display system 202 may be moderately less than the amount of ambient light 211, as indicated by meter 207. Accordingly, a relatively intermediate amount of light transmission is allowed by the see-through display of head-mounted display system 202, as indicated by meter 206. In other words, the see-through display provides an intermediate level of light attenuation. Thus, the amount of ambient light reaching the pupils of user 204 remains relatively low, as indicated by meter 208, even though the amount of ambient light is increased over environment 200.

For environment 220, ambient light 221 is at a relatively high level, as indicated by meter 205. For example, environment 210 may be outdoors in direct sunlight. As such, the amount of light produced by the head-mounted display system 202 may be significantly less than the amount of ambient light 221, as indicated by meter 207. Accordingly, a relatively low amount of light transmission is allowed by the see-through display of head-mounted display system 202, as indicated by meter 206. In other words, the see-through display provides a high level of light attenuation. Thus, the amount of ambient light reaching the pupils of user 204 remains relatively low, as indicated by meter 208, even though the amount of ambient light is increased over environments 200 and 210.

In this example, an increase in ambient light results in a decrease in light transmission through the head-mounted display system, so that the amount of light perceived by the pupil of the user remains constant. However, there may not always be a direct correlation between the amount of ambient light and the amount of light transmission. For example, there may be a threshold amount of ambient light below which no additional attenuation is applied (e.g. ambient light below the maximum amount of light produced by the head-mounted display system). Additionally, there may be a maximum attenuation amount, above which the opacity of the head-mounted display system cannot be increased, even with an increase in ambient light. While in this example the display brightness is held constant, there may be scenarios where the display brightness is increased or decreased based on a relative amount of ambient light. For example, if the light transmission is set at a minimum transmission level and ambient light increases, the display brightness may increase so that display images may continue to be visible to the user. In some examples, the display brightness may be used as a reference level, and the light transmission adjusted so that the perceived light is relative to the display brightness.

Although the examples in FIG. 2 show a constant amount of light perceived by user 204, the amount of light transmission allowed for a given amount of ambient light may vary based on the application of head-mounted display system 202. For example, differing display applications may allow more or less ambient light to reach the pupil of the user. For example, more ambient light may be transmitted through the lens of head-mounted display system 202 if a user is engaged with a program that integrates virtual objects into a real world space, as opposed to a program that simulates night-vision goggles.

In some configurations, light transmission may be constant across the entire surface of the see-through display. However, the light transmission may also be region specific (e.g. some portions of the display are configured to block more light than others).

Because a variety of different ambient light conditions may be experienced, it may be advantageous to provide a wide range of light transmission. Further, due to the dynamically changing nature of environments and therefore of ambient light conditions, it may be advantageous to have continuous feedback about the current ambient light conditions, and a mechanism for rapidly changing the amount of light transmission, in order to continuously integrate virtual world objects with real world objects, as seen by a user wearing a head-mounted computing device.

Figure 3:
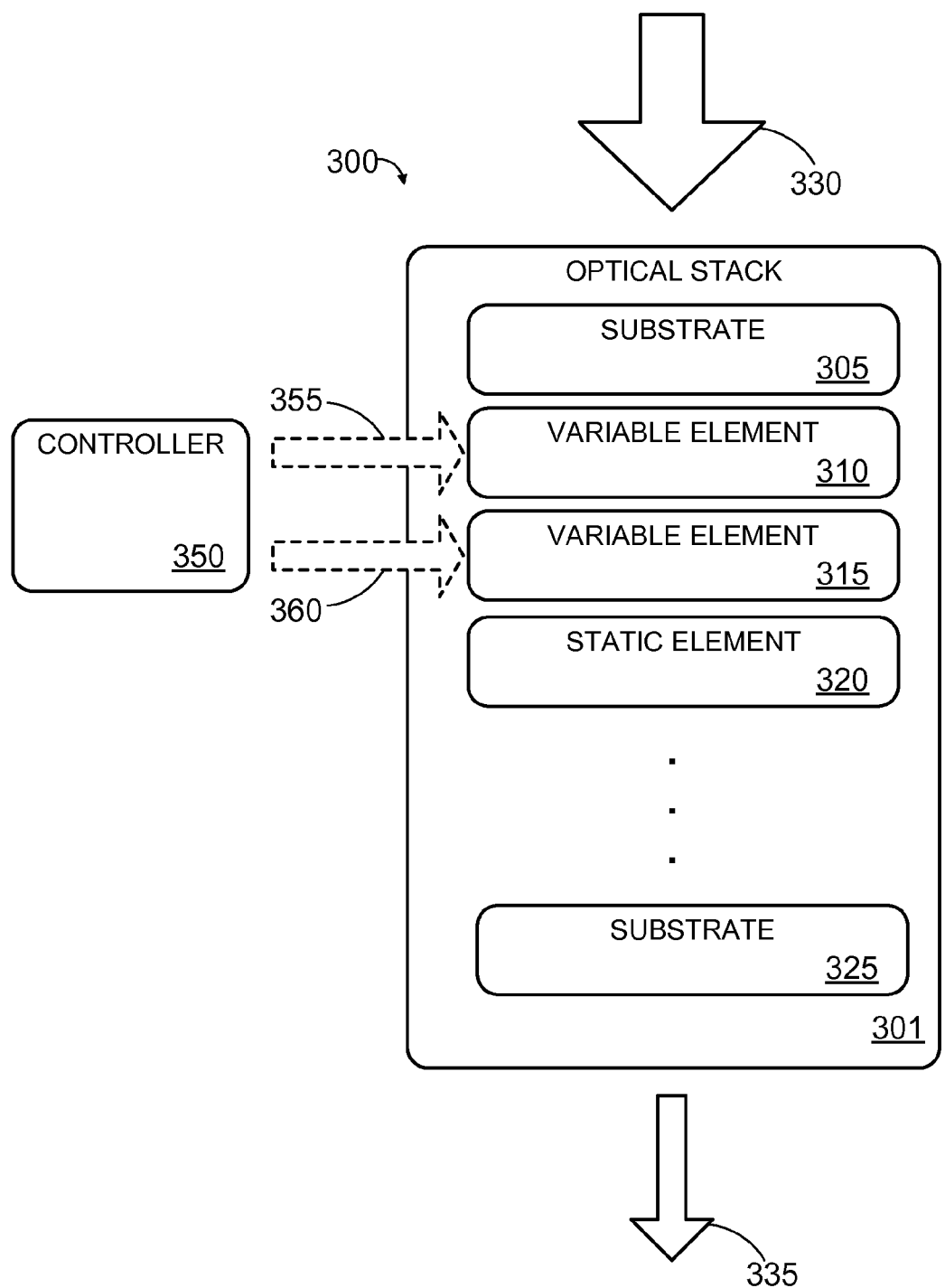
FIG. 3 schematically shows an example see-through display including an optical stack configured to provide variable light transmission.

FIG. 3 schematically shows an example see-through display 300 including an optical stack 301 that may be utilized to attenuate ambient light passing through see-through display 300. Although described in the context of a see-through display, it should be understood that optical stacks as described herein may be applied to various other applications for varying light transmission. For example, optical stacks could be applied to other display types, windows, etc. that may be exposed to various amounts of ambient light. See-through display 300 and optical stack 301 may have two-dimensional and/or three-dimensional geometry (e.g. flat, curved, or a combination of flat and curved surfaces).

Optical stack 301 may comprise an outer substrate layer 305, a first variable element 310, a second variable element 315, a static element 320, and an inner substrate layer 325. Additional variable elements and static elements may be included between substrate layers 305 and 325. The substrate layers, variable elements, and static elements may be stacked in series, such that incoming light 330 passes through each and every layer of optical stack 301, thus yielding outgoing light 335. Outgoing light 335 represents the ambient light that is then perceived by the pupil of a user wearing see-through display 300. The variable elements and static elements may be arranged in any suitable order. Variable elements may be any suitable optical elements that are capable of changing light transmission through optical stack 301 with a variable optical characteristic (e.g. transmission, absorption, or reflection), whereas static elements may be any suitable optical elements configured to alter light transmission through optical stack 301 with a fixed optical characteristic (e.g. high-pass filter, low-pass filter, color shift, etc).

Substrate 305 and substrate 325 may be considered static elements. For example, substrate 305 may be a passive, optically clear plastic material. Substrate 325 may be a static optical element, or may be a sealing substrate. For example, substrate 325 may be configured to provide mechanical rigidity to see-through display 300, and/or to protect against environmental conditions, such as moisture. Variable and static elements may be integrated between substrate 305 and substrate 325 by means of coating, lamination, adhesion, or other mounting techniques.

Variable elements may include, but are not limited to, switchable glass and films utilizing electrochromic, suspended-particle-device (SPD), liquid crystal device, photonic crystal, photochromic, micro-blinds (MEMS), thermochromic, and/or polymer dispersed liquid crystal devices (PDLCs) technologies. Variable and static elements may provide optical effects such as the blocking of infrared radiation, blocking of ultra-violet light, color manipulation, optical pathway manipulation, lensing effects, high-reflection, or anti-reflection surfaces.

The technology used within the variable elements may be selected as suitable for a particular application. Specific examples of combinations of variable elements are described further herein and with regard to FIG. 4. The different technologies mentioned have different characteristics, and thus different strengths and weaknesses that may make them more or less suited for a particular application. By combining variable elements in series within the optical stack, it may be possible to offset a weakness of one variable element with a strength of another variable element.

For example, liquid crystal devices are capable of a continuous light transmission gradient, and are able to switch between light transmission values on the order of 50 ms, but typically have a relatively small range of transmission values. Photonic crystal devices are capable of having a larger light transmission range than for liquid crystal devices, and are able to switch between light transmission values on the order of 100 ms, but typically can only switch between a small number of discrete light transmission values.

Electrochromic devices may also have a continuous light transmission gradient, but currently have switching speeds that are much longer than those for liquid crystal devices. SPDs are capable of having a large light transmission range, but typically impart a color shift on transmitted light. Photochromic devices are typically UV dependent. The use of microblinds may impart a diffraction effect on transmitted light. Thermochromic devices require a source of heat. PDLCs may alter scattering of transmitted light. As technology advances, these or other variable optical elements may become more suited for applications such as optical stack 301, alone or in combination with other variable optical elements.

Variable element 310 and variable element 315 may be configured to alter their optical properties based on signals from controller 350. For example, variable element 310 may be a first variable element configured to vary light transmission through the first element as a function of a first control signal 355. Similarly, variable element 315 may be a second variable element in series with the first variable element and configured to vary light transmission through the second element as a function of a second control signal. Controller 350 may be configured to dynamically supply the first control signal to the first variable element and to supply the second control signal to the second variable element to achieve a greater range of light transmission than either the first variable element or the second variable element provide individually, while providing a switching speed between light transmission levels that is at least as fast as the switching speed of one of the first variable element and the second variable element. For example, in some scenarios, a transition from a first light transmission level to a second light transmission level may be achieved only by changing the light transmission of the variable element with the faster switching speed.

Additional variable elements included in optical stack 301 may also be configured to vary light transmission as a function of a control signal from controller 350. Additional control signals may also be synchronized with first control signal 355 and/or second control signal 360. Variable elements may be grouped into subsets, and each subset of variable elements may be controlled independently or synchronously.

At least one of the variable elements may be an electronically controlled variable element. The first control signal 355 and the second control signal 360 may be electronically synchronized. For example, the first and second control signals may synchronously vary light transmission through the first and second variable elements based on a level of ambient light.

Synchronized control of the variable elements may allow optical stack 301 to achieve continuous electronic control of light attenuation over a large light transmission range and at a high switching speed, among other desirable qualities. For example, controller 350 may be configured to receive information from an ambient light sensor, and further configured to supply the first and second control signals as a function of an amount of ambient light detected.

Static element 320, and other passive layers included in optical stack 301 may also alter the properties of light passing through optical stack 301. Examples of static elements include, but are not limited to, infra-red light filters, ultra-violet light filters, color shift filters, reflective films, anti-reflective films, anti-glare films, lensing effects (e.g. space compensation), and/or image matching effects (e.g. optics for reducing unwanted loss). The total thickness of optical stack 301 may depend on the number of stack layers, but may be on the order of 1 mm. The individual variable layers may be much thinner, for example, on the order of 10 microns.

Figure 4A:
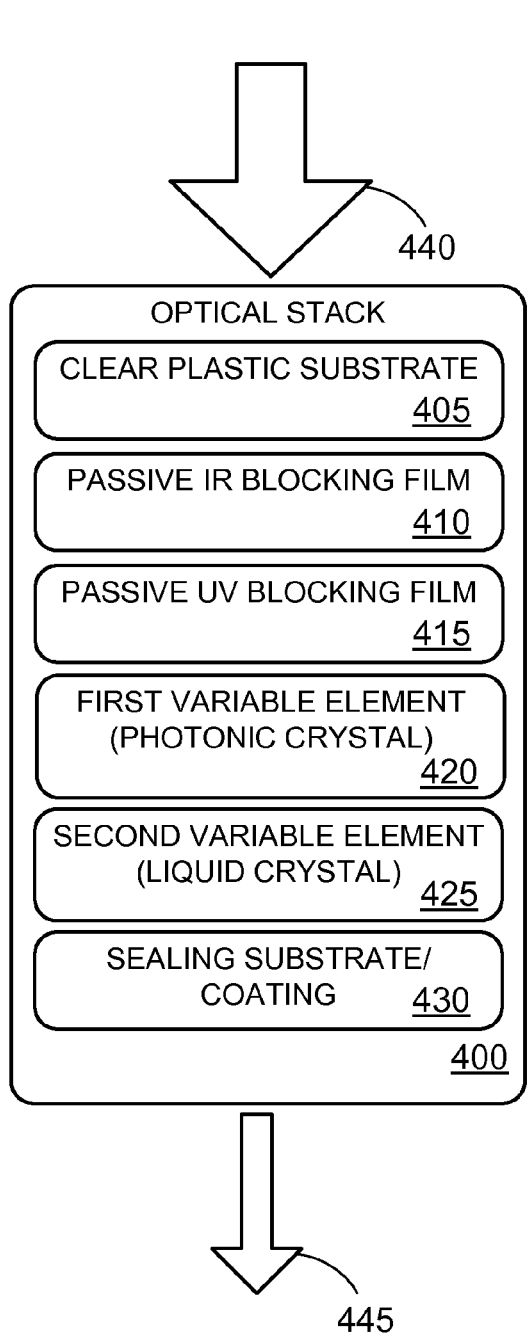
FIGS. 4A and 4B show example optical stacks for providing variable light transmission.
Figure 4B:
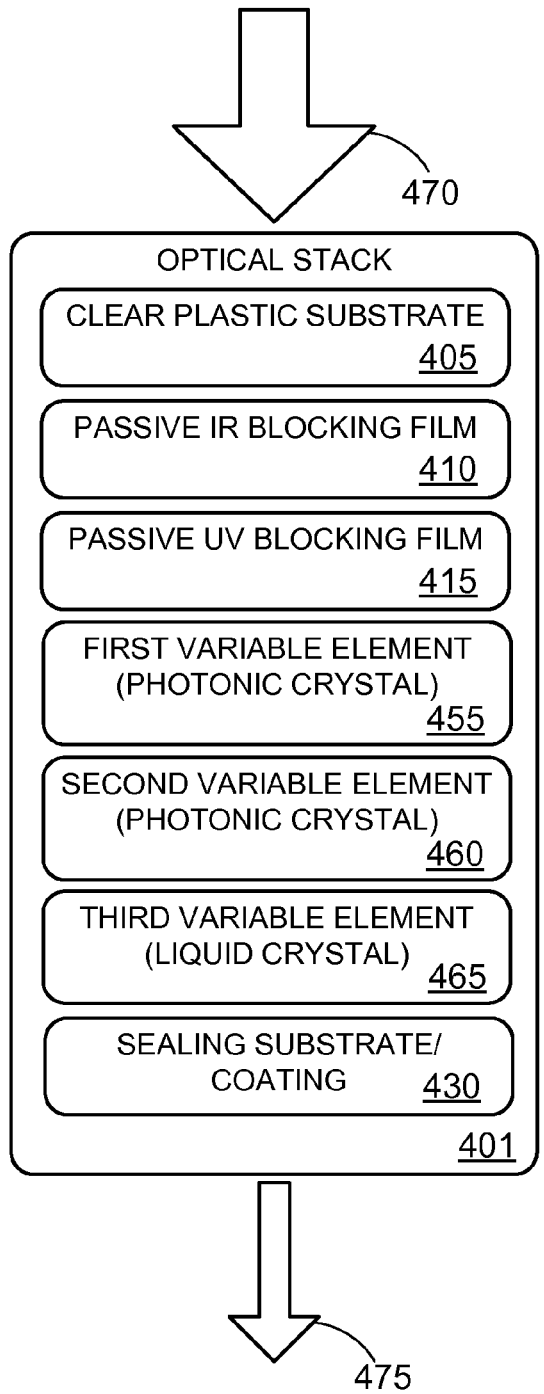

FIGS. 4A and 4B show example optical stacks 400 and 401, respectively. Optical stacks 400 and 401 may be included in see-through display 300. Optical stack 400 comprises a clear plastic substrate 405 located on the input side of the optical stack. Next, optical stack 400 comprises passive IR blocking film 410. IR blocking film 410 may block wavelengths of light greater than 700 nm, for example. Optical stack 400 may further comprise passive UV blocking film 415. UV blocking film 415 may block wavelengths of light smaller than 400 nm, for example. Together, IR blocking film 410 and UV blocking film 415 may block a majority of light outside the visible spectrum.

Optical stack 400 comprises two variable elements: 420 and 425. In this example, first variable element 420 is a photonic crystal layer, while second variable element 425 is a liquid crystal layer. As discussed herein, the photonic crystal layer provides a large light transmission range control at a high switching speed, and with discreet tunable light transmission intervals, while the liquid crystal layer provides a smaller light transmission range control at a high switching speed, but with a continuously tunable light transmission gradient. First variable element 420 and second variable element 425 may change light transmission levels based on synchronous control signals received from a controller (not shown). Optical stack 400 may further comprise a sealing substrate or coating layer 430.

By placing a photonic crystal layer and a liquid crystal layer in series, optical stack 400 may achieve continuous control of light attenuation between light transmission levels with a switching speed that is at least as fast as the switching speed of the slower dimming material, in this case the photonic crystal layer. Further, the switching speed will be as fast as the faster of the layers for at least some switches that do not involve the slower layer switching.

For example, the photonic crystal layer may have three discreet light transmission intervals: 17%, 57% and 97%, and be capable of switching between the discreet intervals on the order of 100 ms. The liquid crystal layer may have a continuously tunable light transmission gradient between 20% and 70%, and be capable of switching between levels on the order of 50 ms. When provided synchronous control signals, the optical stack can support continuous electronic tuning of light transmission between 3.4% and 68%, with a switch speed on the order of 100 ms for some switches and a switch speed of 50 ms for other switches. In this way, as input light 440 changes, optical stack 400 may continuously vary its light transmission levels to provide a desired amount of output light 445.

Optical stack 401 is similar to optical stack 400, but comprises three variable elements: 455, 460, and 465. In this example, first variable element 455 is a photonic crystal layer, second variable element 460 is a photonic crystal layer, and third variable element 465 is a liquid crystal layer. In this example, variable elements 455 and 460 have identical properties, but in other configurations may have different optical properties.

In this example, the photonic crystal layer may have three discreet light transmission intervals: 17%, 71% and 97%, and be capable of switching between the discreet intervals on the order of 100 ms. The liquid crystal layer may have a continuously tunable light transmission gradient between 60% and 95%, and may be capable of switching between levels on the order of 50 ms. When provided synchronous control signals, the optical stack can support continuous electronic tuning of light transmission between 1.7% and 90%, with a switch speed on the order of 100 ms for some switches and a switch speed of 50 ms for other switches. In this way, as input light 470 changes, optical stack 400 may continuously vary its light transmission levels to provide a desired output light 475.

With multiple variable elements in series, it may be possible to achieve the same overall light transmission through the optical stack with multiple combinations of control signals. For example, in the case of optical stack 400, it is possible to achieve 35% light transmission with two different combinations of control signals. In a first set of control signals, the photonic crystal layer may be controlled to 97% light transmission and the liquid crystal layer controlled to 36% light transmission. In a second set of control signals, the photonic crystal layer may be controlled to 57% light transmission and the liquid crystal layer controlled to 61.4% light transmission. Although the two sets of control signals may achieve equivalent light transmission through the optical stack, the operating parameters for supplying the control signals may be different.

For example, the power consumed by the first and second control signals may be different. Both the liquid crystal layer and photonic crystal layer may cooperatively realize maximum light transmission when a control signal with a zero value (e.g. no additional power is consumed) is supplied to the layer. In the case of optical stack 400, supplying a control signal with a zero value to the photonic crystal layer results in a 97% light transmission, while supplying a control signal with a zero value to the liquid crystal layer results in a 70% light transmission, thus yielding a 68% light transmission through optical stack 400.

Commanding the liquid crystal layer to a lower light transmission level may consume less power than commanding the photonic crystal layer to a lower light transmission level. As such, it may be advantageous to supply a control signal with a zero value to the photonic crystal layer if a commanded light transmission level can be achieved when the photonic crystal layer is set to achieve maximum light transmission (e.g. consuming no power). A control signal with a non-zero value (e.g. consuming power) may be supplied to the liquid crystal layer to achieve the commanded light transmission level.

The optical stack may thus be calibrated and characterized for a plurality of light transmission settings. A photometric measurement of controlled light rays through all optical elements (each may involve multiple points) can be performed to determine a default optical state of the system across the entire field of view. Active/dynamic control calibration and characterization can be done by performing time-varied photometric measurements and monitoring of the electronic control signal, with additional tuning performed as desired. A lookup table of light transmission settings and operational parameters may be stored in non-transitory memory so that a favored set of control signals may be applied to realize a targeted light transmission based on one or more operational parameters. For example, the controller may be configured to provide first and second control signals to synchronously vary light transmission through the first and second variable elements based on a minimum power consumption required to achieve a desired light transmission level.

For optical stack 400, the photonic crystal layer transmission setting may be selected based on the ambient light in the environment, For example, the photonic crystal layer may be set at the lowest transmission setting in a bright, outdoor environment, set at the middle transmission setting in a bright, indoor environment, and at the highest transmission setting in a dimly lit, indoor environment. For each photonic crystal layer transmission setting, the liquid crystal layer transmission setting may be dynamically changed for continuous fine-tuning. This may achieve a large transmission range at a high speed with an efficient use of power.

There may be scenarios wherein the optimal power consumption is bypassed in order to achieve a faster or smoother transition from a first light transmission setting to a second light transmission setting. Such scenarios may include an ambient light change above a threshold, requiring a rapid change from a first light transmission setting to a second light transmission setting, or a specific display application where an increase in power consumption is acceptable to improve a user's experience.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
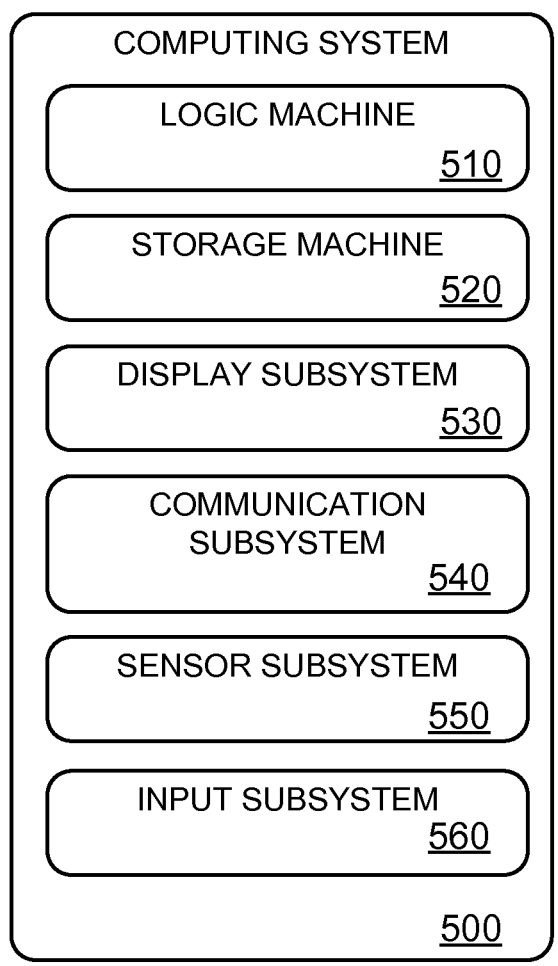
FIG. 5 schematically shows a computing system useable to control an optical stack configured for variable light transmission.

FIG. 5 schematically shows a non-limiting example of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a storage machine 520. Computing system 500 may also include a display subsystem 530, communication subsystem 540, sensor subsystem 550, input subsystem 560 and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 520 includes one or more physical devices configured to hold instructions executable by the logic machine to implement the methods and processes described herein. When such methods and processes are implemented, the state of storage machine 520 may be transformed—e.g., to hold different data.

Storage machine 520 may include removable and/or built-in devices. Storage machine 520 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 520 may include volatile, nonvolatile, dynamic, static, read/write, read-only, random-access, sequential-access, location-addressable, file-addressable, and/or content-addressable devices.

It will be appreciated that storage machine 520 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 520 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 530 may be used to present a visual representation of data held by storage machine 520. This visual representation may take the form of a graphical user interface (GUI). As the herein described methods and processes change the data held by the storage machine, and thus transform the state of the storage machine, the state of display subsystem 530 may likewise be transformed to visually represent changes in the underlying data. Display subsystem 530 may include one or more display devices utilizing virtually any type of technology. Such display devices may be combined with logic machine 510 and/or storage machine 520 in a shared enclosure, or such display devices may be peripheral display devices. For example, display subsystem 530 may take the form of head-mounted display system 100 as shown in FIG. 1. As described herein, the head-mounted display system may include see-through display 102 and image production system 103.

Communication subsystem 540 may be configured to communicatively couple computing system 500 with one or more other computing devices. Communication subsystem 540 may include wired and/or wireless communication devices compatible with one or more different communication protocols. As non-limiting examples, the communication subsystem may be configured for communication via a wireless telephone network, or a wired or wireless local- or wide-area network. In some configurations, the communication subsystem may allow computing system 500 to send and/or receive messages to and/or from other devices via a network such as the Internet.

Sensor subsystem 550 may include one or more sensors configured to sense different physical phenomenon (e.g., visible light, infrared light, sound, acceleration, orientation, position, etc.) as described herein. For example, sensor subsystem 550 may include one or more inward facing optical sensors, one or more outward facing optical sensors, and one or more positional sensors. Sensor subsystem 550 may be configured to provide sensor data to logic machine 510, for example. As described herein, such data may include gaze tracking information, depth tracking information, image information, audio information, ambient lighting information, position information, motion information, user location information, and/or any other suitable sensor data that may be used to perform the methods and processes described above.

When included, input subsystem 560 may comprise or interface with one or more user-input devices such as a keyboard, mouse, touch screen, or game controller. In some configurations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical stack assembly, comprising:
a first variable element having a discrete number of light transmission intervals and configured to vary light transmitted through the first variable element as a function of a first control signal;
a second variable element having a continuously tunable light transmission gradient in series with the first variable element and configured to vary light transmitted through the second variable element as a function of a second control signal, wherein a range of light transmission of the first variable element is greater than a range of light transmission of the second variable element; and
a controller to dynamically supply the first control signal to the first variable element and to supply the second control signal to the second variable element to achieve a greater range of light transmission than either the first variable element or the second variable element provide individually.

2. The optical stack of claim 1, wherein the first control signal and the second control signal are electronically synchronized.

3. The optical stack of claim 1, wherein the first variable element comprises a photonic crystal material.

4. The optical stack of claim 1, wherein the second variable element comprises a liquid crystal material.

5. The optical stack of claim 1, further comprising:
one or more static elements in series with the first and second variable elements and configured to vary light transmission through the optical stack.

6. The optical stack of claim 1, further comprising:
one or more additional variable elements in series with the first and second variable elements.

7. The optical stack of claim 6, further comprising:
one or more substrates in series with the first and second variable elements and configured to not vary light transmission through the optical stack.

8. A head-mounted display system, comprising:
a see-through display configured to display an image of a virtual object while transmitting ambient light from a surrounding environment;
an optical stack, including:
a first variable element having a discrete number of light transmission intervals and in series with the see-through display and configured to vary ambient light transmitted through the see-through display as a function of a first control signal; and
a second variable element in series with the see-through display and the first variable element and configured to vary ambient light transmitted through the see-through display as a function of a second control signal; and
a controller to dynamically supply the first control signal to the first variable element and to supply the second control signal to the second variable element to achieve a greater range of ambient light transmission through the see-through display than either the first variable element or the second variable element provides individually.

9. The head-mounted display system of claim 8, further comprising:
an ambient light sensor; and
wherein the first and second control signals synchronously vary ambient light transmission through the first and second variable elements based on a level of ambient light detected by the ambient light sensor.

10. The head-mounted display system of claim 9, wherein the first and second control signals synchronously vary ambient light transmission through the first and second variable elements based on a display application.

11. The head-mounted display system of claim 10, wherein the first and second control signals synchronously vary ambient light transmission through the first and second variable elements based on a minimum power consumption required to achieve a desired ambient light transmission level.

12. The head-mounted display system of claim 9, wherein the second variable element has a continuously tunable light transmission gradient.

13. The head-mounted display system of claim 12, wherein the first variable element comprises a photonic crystal material, and the second variable element comprises a liquid crystal material.

14. A head-mounted display system, comprising:
   a see-through display configured to display an image of a virtual object while transmitting ambient light from a surrounding environment;
   an ambient light sensor;
   an optical stack, including:
      a clear plastic substrate;
      a passive infra-red light blocking film in series with the see-through display;
      a passive ultra-violet light blocking film in series with the see-through display;
      a photonic crystal element configured to vary ambient light transmission through the see-through display at discrete light transmission intervals as a function of a first control signal based on an amount of ambient light detected by the ambient light sensor; and
      a liquid crystal element configured to vary ambient light transmission through the see-through display over a continuous light transmission gradient as a function of a second control signal based on the amount of ambient light detected by the ambient light sensor; and
   a controller to dynamically supply the first control signal to the photonic crystal element and to supply the second control signal to the liquid crystal element.

15. The head-mounted display system of claim 14, wherein the photonic crystal element and the liquid crystal element cooperatively realize maximum light transmission when a control signal with a zero value is supplied.

16. The head-mounted display system of claim 15, wherein the first control signal consumes more power than the second control signal when the first and second control signals each have non-zero values.

17. The head-mounted display system of claim 16, wherein the controller is configured to:
   dynamically supply a first control signal with a zero value if a commanded light transmission can be realized when the photonic crystal element has maximum light transmission.

* * * * *